(12) United States Patent
Lee

(10) Patent No.: US 10,333,165 B2
(45) Date of Patent: Jun. 25, 2019

(54) SYSTEM FOR ADSORBING THIN FILM SHEET TO PREVENT FROM DROOPING IN FUEL CELL SYSTEM

(71) Applicants: HYUNDAI MOTOR COMPANY, Seoul (KR); KIA MOTORS CORPORATION, Seoul (KR)

(72) Inventor: Sun Ho Lee, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/164,514

(22) Filed: Oct. 18, 2018

(65) Prior Publication Data
US 2019/0051918 A1    Feb. 14, 2019

Related U.S. Application Data

(62) Division of application No. 14/925,931, filed on Oct. 28, 2015, now Pat. No. 10,135,083.

(30) Foreign Application Priority Data

May 21, 2015  (KR) ..................... 10-2015-0071079

(51) Int. Cl.
*B23Q 1/00* (2006.01)
*H01M 8/1004* (2016.01)

(52) U.S. Cl.
CPC .................. *H01M 8/1004* (2013.01)

(58) Field of Classification Search
CPC . B23P 11/00; B23P 13/00; B23P 19/00; B23P 19/21; B23Q 1/03; B23Q 1/15; B23Q 3/00
See application file for complete search history.

(56) References Cited

U.S. PATENT DOCUMENTS 5,725,205 A * 3/1998 O'Berg .................. B25B 11/02
                                                    269/289 R
6,328,296 B2 * 12/2001 Tyveleijn .......... H01L 21/68728
                                                    269/287
(Continued)

FOREIGN PATENT DOCUMENTS

JP      2007-287436 A     11/2007
KR   10-2009-0059819 A     6/2009

OTHER PUBLICATIONS

U.S. Notice of Allowance dated Jul. 18, 2018 issued in U.S. Appl. No. 14/925,931.

*Primary Examiner* — Lee D Wilson
(74) *Attorney, Agent, or Firm* — Morgan Lewis & Bockius LLP

(57) ABSTRACT

A system for adsorbing a thin film sheet includes a main frame and first and second auxiliary frames connected to respective ends of the main frame. At least one of the first and second auxiliary frames is movably connected to the main frame to increase or decrease a distance between the first and second auxiliary frames. Adsorbing parts are disposed under the first and second auxiliary frames, respectively, to draw or inject air and to adsorb both sides of the thin film sheet. A tension adjusting part adjusts a location of the at least one of the first and second auxiliary frames to adjust a tension applied to the thin film sheet.

6 Claims, 4 Drawing Sheets

(56) References Cited

U.S. PATENT DOCUMENTS

| | | | |
|---|---|---|---|
| 7,070,178 B2* | 7/2006 | Van Der Toorn | H01L 21/687 269/289 R |
| 8,523,156 B2* | 9/2013 | Hou | B25B 5/10 269/165 |
| 10,135,083 B2* | 11/2018 | Lee | H01M 8/1004 |
| 2016/0344053 A1* | 11/2016 | Lee | H01M 8/1004 |

* cited by examiner

SYSTEM FOR ADSORBING THIN FILM SHEET TO PREVENT FROM DROOPING IN FUEL CELL SYSTEM

CROSS-REFERENCE TO RELATED APPLICATION

This application is a divisional patent application of U.S. patent application Ser. No. 14/925,931, filed on Oct. 28, 2015 which claims the benefit of priority to Korean Patent Application No. 10-2015-0071079 filed in the Korean Intellectual Property Office on May 21, 2015, their entire contents of which are incorporated herein by reference.

TECHNICAL FIELD

The present disclosure relates to a system for adsorbing a thin film sheet in a fuel cell system, which capable of adsorbing both sides of the thin film sheet, in which a membrane-electrode assembly (MEA) is combined with a gas diffusion layer (GDL) to prevent a center portion of the thin film sheet from drooping.

BACKGROUND

In general, a fuel cell system is a power generating system which electrochemically converts chemical energy of fuel into electrical energy within a fuel cell stack without changing the chemical energy into heat by combustion.

The fuel cell system generally includes the fuel cell stack generating the electrical energy and a fuel supply system supplying a fuel (hydrogen) to the fuel cell stack. An air supply system supplies oxygen in air, which is an oxidizing agent necessary for an electrochemical reaction, to the fuel cell stack. A heat/water management system removes heat of the fuel cell stack to outside and controls an operation temperature of the fuel cell stack.

Through the aforementioned configuration, the fuel cell system generates electricity by the electrochemical reaction between hydrogen that is the fuel and oxygen in the air, and discharges the heat and water as reaction by-products.

A fuel cell system for a vehicle, which is an energy converting apparatus formed of a membrane-electrode assembly (hereinafter referred to as an "MEA"), comprises an electrode/catalyst layer attached to both sides of an electrolyte membrane for generating an electrochemical reaction. As hydrogen ions move, a gas diffusion layer (hereinafter referred to as a "GDL") evenly distributes reaction gas and transmits generated electricity and a gasket and a fastening mechanism maintains a sealing property and an appropriate fastening pressure of the reaction gas and a coolant. A separator, in which the reaction gas and the coolant move, generates a current by a cell reaction when hydrogen and oxygen (air) are injected.

In a polymer solid electrolyte fuel cell, hydrogen is supplied to a positive electrode (also referred to as a "fuel electrode"), and oxygen (air) is supplied to a negative electrode (also referred to as an "air electrode" or an "oxygen electrode").

The hydrogen supplied to the positive electrode is dissolved into hydrogen ions (protons, H+) and electrons (e−) by a catalyst of the electrode layer formed on both sides of the electrolyte membrane, and among them, only the hydrogen ions (protons, H+) selectively pass through the electrolyte membrane that is a positive ion exchange membrane and are transmitted to the negative electrode, and simultaneously, the electrons (e−) are transmitted to the negative electrode through the GDL that is a conductor and the separator.

A reaction occurs in the negative electrode in which the hydrogen ions supplied through the electrolyte membrane and the electrons transmitted through the separator react with the oxygen supplied to the negative electrode to generate water.

A current is generated by the electrons flowing through an external conductive wire as the hydrogen ions move, and heat is also generated in the water generation reaction.

In order to manufacture a fuel cell, a loading/unloading system for adsorbing a thin film sheet of a combination of the MEA and the GDL and moving the adsorbed thin film sheet has been applied.

An adsorption part adsorbs both upper sides of the thin film sheet for the fuel cell. A center portion of the thin film sheet, which is not adsorbed during a loading/unloading process, may droop to a lower side by gravity. Due to the drooping phenomenon, the entire thin film sheet may be separated or fall from the adsorption part to degrade quality of the fuel cell and production efficiency.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide a system for adsorbing a thin film sheet (a membrane-electrode assembly (MEA)+a gas diffusion layer (GDL)) from drooping, which adsorbs the thin film sheet and prevents the thin film sheet from drooping, thereby improving quality of a fuel cell.

According to an exemplary embodiment of the present inventive concept, a system for adsorbing a thin film sheet includes a main frame and first and second auxiliary frames connected to respective sides of the main frame. At least one of the first and second auxiliary frames is movably connected to the main frame to increase or decrease a distance between the first and second auxiliary frames. Adsorbing parts are disposed under the first and second auxiliary frames, respectively, to draw or inject air and to adsorb both sides of the thin film sheet. A tension adjusting part adjusts a location of the at least one of the first and second auxiliary frames in the main frame to adjust a tension applied to the thin film sheet.

The tension adjusting part may include a tension applying cylinder pushing or pulling the at least one of the first and second auxiliary frames toward or from the main frame.

The tension adjusting part may further include a fixing brake limiting movement of the at least one of the first and second auxiliary frames by the tension applying cylinder.

The thin film sheet may include a membrane-electrode assembly (MEA), and a gas diffusion layer (GDL) attached to a center portion of one surface of the MEA.

The adsorbing parts may include MEA adsorbing parts disposed under the first and second auxiliary frames and adsorbing the MEA. GDL adsorbing parts are disposed at one side of the MEA adsorbing parts under the first and second auxiliary frame and adsorbing the GDL.

The system may further include a vertically moving part vertically moving the MEA adsorbing parts and the GDL adsorbing parts.

One of the first and second auxiliary frames may be fixed to the main frame, and the other may be movably connected to the main frame in a longitudinal direction. The system may further include a proximity sensor mounted on the main frame to detect an approach of the thin film sheet adsorbed by the adsorbing parts.

The system may further include an ultrasonic sensor mounted on the main frame to detect a thickness of the thin film sheet or the number of thin film sheets adsorbed by the adsorbing parts.

The GDL adsorbing part may include a suctioning gripper sucking air and adsorbing the thin film sheet.

The MEA adsorbing parts may include a porous pad which is in contact with one surface of the thin film sheet.

The at least one of the first and second auxiliary frames may move on a rail which is attached to the main frame.

According to another exemplary embodiment of the present inventive concept, a method of adsorbing a thin film sheet includes moving a main frame toward the thin film sheet. Both sides of the thin film sheet are adsorbed through adsorbing parts attached to first and second auxiliary frames, which movably connected to both sides of the main frame, respectively. A tension applied to the thin film sheet is adjusted by adjusting a distance between the first and second auxiliary frames through a tension adjusting part. The method may further include applying the tension to the thin film sheet such that the tension is maintained by limiting movement of at least one of the first and second auxiliary frames using a fixing brake.

The method may further include detecting an approach of the thin film sheet, which is to be adsorbed to the adsorbing part, through a proximity sensor.

The method may further include detecting a thickness of the thin film sheet or the number of thin film sheets adsorbed to the adsorbing part through an ultrasonic sensor.

DETAILED DESCRIPTION OF THE EMBODIMENTS

An exemplary embodiment of the present inventive concept will hereinafter be described in detail with reference to the accompanying drawings.

Figure 1:
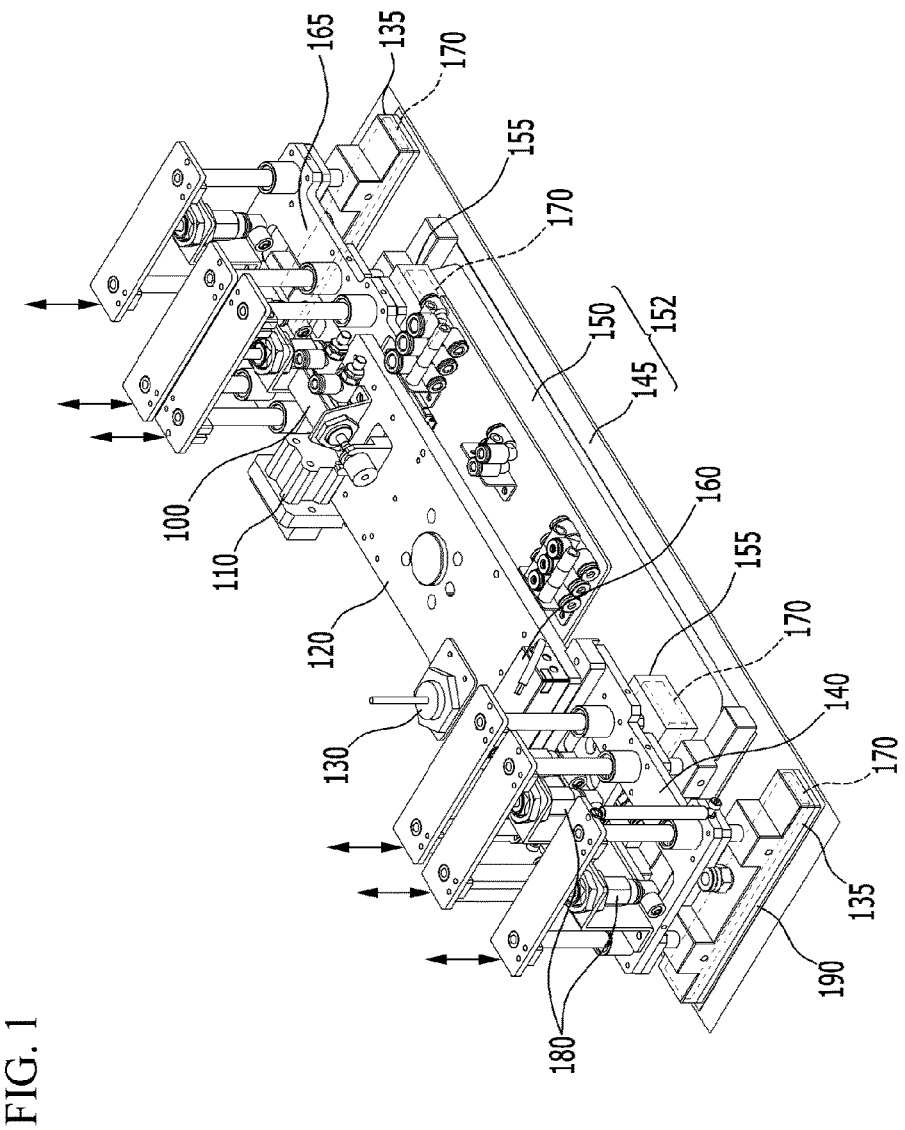
FIG. 1 is a perspective view of a system for adsorbing a thin film sheet from according to an exemplary embodiment of the present inventive concept.

FIG. 1 is a perspective view of a system for adsorbing a thin film sheet according to an exemplary embodiment of the present inventive concept.

Referring to FIG. 1, a thin film sheet adsorbing system includes a tension applying cylinder 100, a fixing brake 110, a main frame 120, an ultrasonic sensor 130, a vertically moving part 180, a porous pad 190, a membrane-electrode assembly (MEA) adsorbing part 135, a first auxiliary frame 140, an MEA 145, a gas diffusion layer (GDL) 150, a GDL adsorbing part 155, a proximity sensor 160, and a second auxiliary frame 165.

The first and second auxiliary frames 140 and 165 are disposed at both sides of the main frame 120 in a longitudinal direction of the main frame 120, respectively. At least one of the first and second auxiliary frames 140 and 165 is connected so as to reciprocate in the longitudinal direction of the main frame 120 based on the main frame 120.

Further, the tension applying cylinder 100 is provided on an upper surface of the main frame 120. The tension applying cylinder 100 pushes or pulls at least one of the first and second auxiliary frames 140 and 165.

The MEA adsorbing part 135 and the GDL adsorbing part 155 are spaced apart from each other and located at lower sides of the first and second auxiliary frames 140 and 165, respectively. The MEA adsorbing part 135 includes a suctioning gripper 170 suctioning air and adsorbing one surface of the MEA 145. The GDL adsorbing part 155 may include both a Bernoulli gripper injecting air and floating the GDL 150 to the air, and the suctioning griper 170 suctioning air and adsorbing the GDL 150.

The MEA adsorbing part 135 and the GDL adsorbing part 155 are located below the first and second auxiliary frames 140 and 165, respectively, and vertically move based on the first and second auxiliary frames 140 and 165. The vertically moving part 180 may vertically move the MEA adsorbing part 135 and the GDL adsorbing part 15 using hydraulic pressure (pneumatic pressure).

Figure 4:
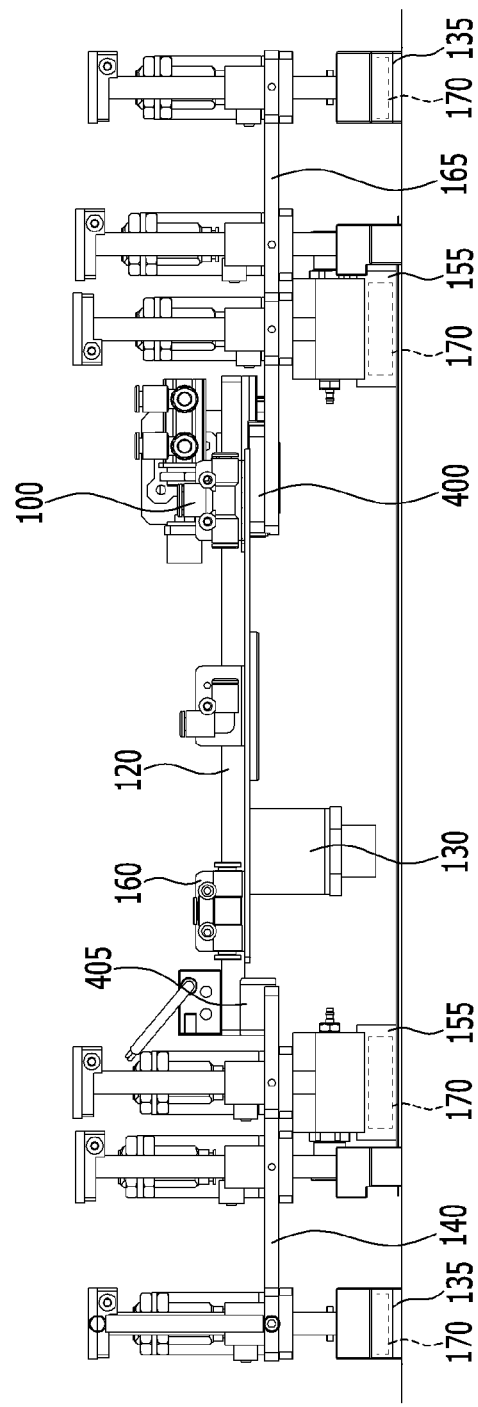
FIG. 4 is a front view of the system for adsorbing a thin film sheet according to the exemplary embodiment of the present inventive concept.

Under the main frame 120, the second auxiliary frame 165 slides along a guide rail 400 (see FIG. 4). The second auxiliary frame 165 moves based on the main frame 120 by the tension applying cylinder 100.

Then, the fixing brake 110 may apply a frictional force to the second auxiliary frame 165 to limit the movement of the second auxiliary frame 165.

The ultrasonic sensor 130 and the proximity sensor 160 are mounted to an upper side or a lower side of the main frame 120. The proximity sensor 160 detects an approach of the GDL 150 or the MEA 145 when the main frame 120 moves.

Further, the ultrasonic sensor 130 irradiates ultrasonic waves to the GDL 150 or the MEA 145 facing the main frame 120 to detect a thickness of the GDL 150 or the MEA 145 and detect the number of sheets according to the thickness.

Figure 2:
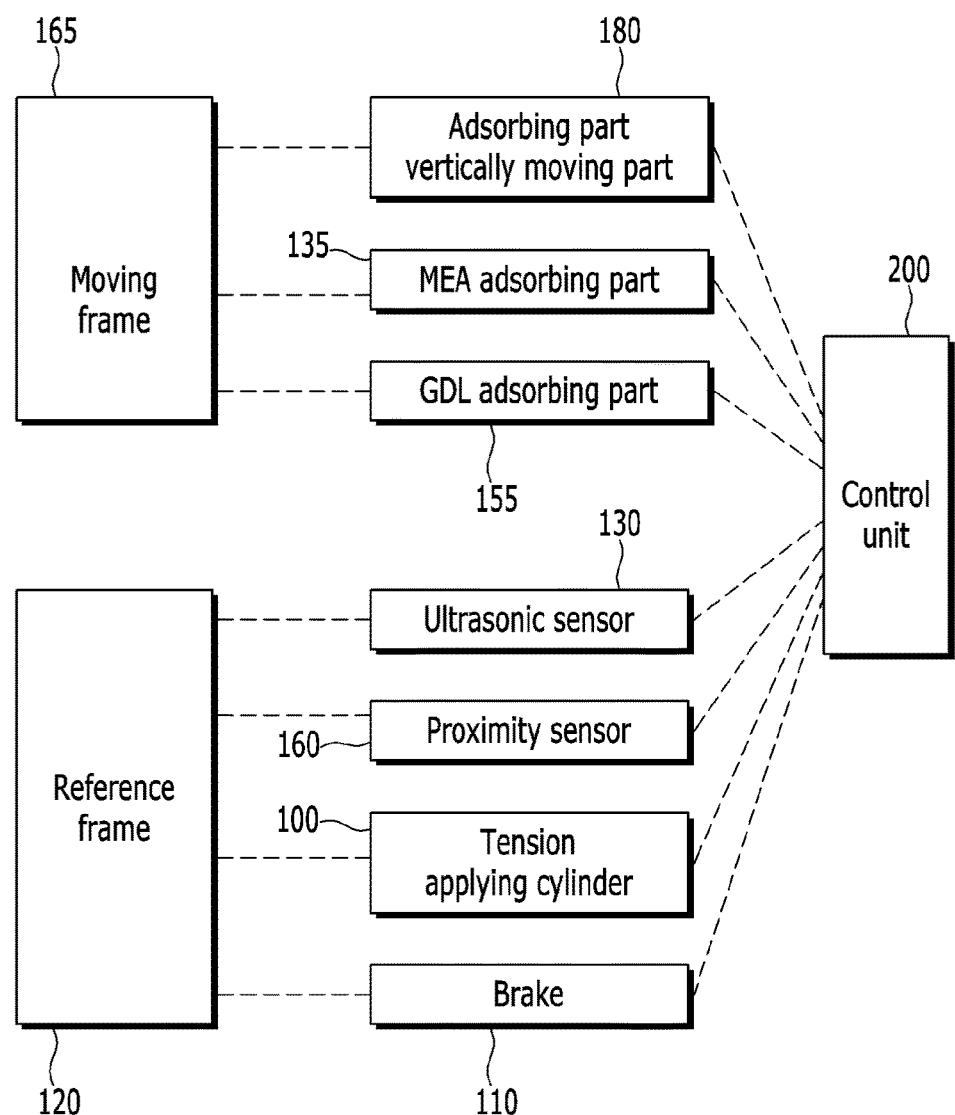
FIG. 2 is a schematic configuration diagram of the system for adsorbing a thin film sheet according to the exemplary embodiment of the present inventive concept.

FIG. 2 is a schematic configuration diagram of the system for adsorbing a thin film sheet according to the exemplary embodiment of the present inventive concept.

Referring to FIG. 2, the ultrasonic sensor 130, the proximity sensor 160, the tension applying cylinder 100, and the fixing brake 110 are disposed in the main frame 120, and a signal detected by the ultrasonic sensor 130 and the proximity sensor 160 is transmitted to a controller 200. Further, the controller 200 may control the tension applying cylinder 100 and the fixing brake 110.

That is, the controller 200 may control the hydraulic pressure (pneumatic pressure) applied to the tension applying cylinder 100 to operate the tension applying cylinder 100, and forms a frictional force through the fixing brake 110 to limit the movement of the second auxiliary frame 165.

The MEA adsorbing part 135 and the GDL adsorbing part 155 vertically movably connected to lower sides of the first and second auxiliary frames 140 and 165. The vertically moving part 180 vertically moves the MEA adsorbing part 135 and the GDL adsorbing part 155 using the supplied hydraulic pressure (pneumatic pressure).

The controller 200 may control the MEA adsorbing part 135, the GDL adsorbing part 155, and the vertically moving part 180.

That is, the controller 200 may allow the MEA adsorbing part 135 and the GDL adsorbing part 155 draw or inject air by operating a vacuum pump (not illustrated) or a blower (not illustrated) to adsorb the MEA 145 and the GDL 150. Further, the controller 200 may control heights of the MEA adsorbing part 135 and the GDL adsorbing part 155 by operating the vertically moving part 180 by controlling the hydraulic pressure (pneumatic pressure).

The controller 200 may be implemented by one or more micro-processors operated by a predetermined program, and the predetermined program may include a series of commands for performing a method according to the present disclosure to be described below.

Figure 3:
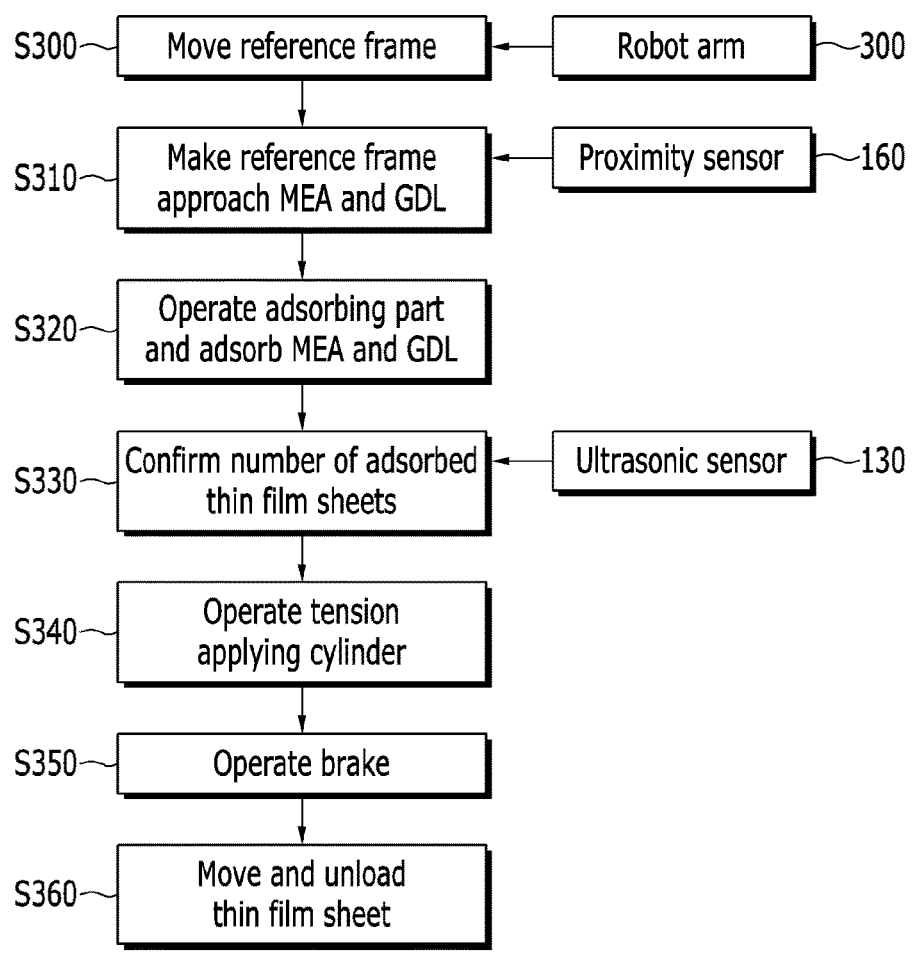
FIG. 3 is a flowchart illustrating a method of adsorbing a thin film sheet using the system for adsorbing a thin film sheet according to an exemplary embodiment of the present inventive concept.

FIG. 3 is a flowchart illustrating a method of adsorbing a thin film sheet using the system for adsorbing a thin film sheet according to an exemplary embodiment of the present inventive concept.

Referring to FIG. 3, a robot arm 300 moves the main frame 120 to a predetermined location in S300. The main frame 120 approaches a thin film sheet 152, in which the GDL is bonded to the MEA 145, in S310. The approach of the main frame 120 to the thin film sheet 152 may be detected by the proximity sensor 160.

In S320, the MEA adsorbing part 135 and the GDL adsorbing part 155 suck or inject air to form vacuum, thereby adsorbing the MEA 145 and the GDL 150, respectively.

In the present disclosure, the MEA adsorbing part 135 may include an suctioning gripper 170 which extracts air and adsorbs the MEA 145. The porous pad 190, which is in contact with the MEA 145, may be disposed in the MEA adsorbing part 135.

Further, the GDL adsorbing part 155 may include a Bernoulli gripper which injects air and floats the GDL 150, and the suctioning griper which inhales the air and adsorbs the floated GDL 150.

In S330, a thickness of the adsorbed thin film sheet (the MEA+the GDL) or the number of thin film sheets is detected through the ultrasonic sensor 130. In S340, the second auxiliary frame 165 moves to an external side based on the main frame 120 by controlling hydraulic pressure (pneumatic pressure) supplied to the tension applying cylinder 100, so that the MEA adsorbing part 135 and the GDL adsorbing part 155 pull both sides of the thin film sheet 152.

In S350, the fixing brake 110 operates to limit a movement of the second auxiliary frame 165. Then, in S360, the robot arm 300 moves the main frame 120 to move the thin film sheet 152 to a predetermined location, stops the operation of the adsorbing part, and unloads the thin film sheet 152 to a predetermined location.

Accordingly, in the present disclosure, tension is applied to the thin film sheet 152, so that it is possible to effectively prevent a center portion, which is not adsorbed, from drooping to a lower side, and prevent the thin film sheet from being separated from the adsorbing part due to the drooping.

FIG. 4 is a front view of the system for adsorbing a thin film sheet according to the exemplary embodiment of the present inventive concept, and descriptions of similar or identical parts to those of FIG. 1 will be omitted, and differences will be mainly described.

Referring to FIG. 4, the first and second auxiliary frames 140 and 165 are disposed at lower surfaces of both ends of the main frame 120, and the main frame 120 and the first and second auxiliary frames 140 and 165 are parallel to each other.

An upper surface of one end of the first auxiliary frame 140 may be fixed to the main frame 120 through a bracket 405, and the second auxiliary frame 165 may be movably connected to the main frame 120 through the rail 400.

Accordingly, in the system for adsorbing a thin film sheet according to the exemplary embodiment of the present inventive concept, the tension applying cylinder 100 controls tension applied to the thin film sheet 152 by moving the GDL adsorbing part 155 and the MEA adsorbing part 135 in a state where the GDL adsorbing part 155 and the MEA adsorbing part 135 adsorb both sides of the thin film sheet 152, respectively, so that it is possible to easily prevent the center portion of the thin film sheet 152 from drooping to the lower side.

While this invention has been described in connection with what is presently considered to be practical exemplary embodiments, it is to be understood that the invention is not limited to the disclosed embodiments, but on the contrary, is intended to cover various modifications and equivalent arrangements included within the spirit and scope of the appended claims.

What is claimed is:

1. A method of adsorbing a thin film sheet, the method comprising:
   moving a main frame toward the thin film sheet using a robot arm;
   adsorbing both sides of the thin film sheet through adsorbing parts attached to first and second auxiliary frames, which movably connected to both sides of the main frame, respectively; and
   adjusting a tension applied to the thin film sheet by adjusting a distance between the first and second auxiliary frames through a tension adjusting part.

2. The method of claim 1, further comprising:
   applying the tension to the thin film sheet such that the tension is maintained by limiting movement of at least one of the first and second auxiliary frames using a fixing brake.

3. The method of claim 1, further comprising:
   detecting, by a proximity sensor, an approach of the thin film sheet which is to be adsorbed to the adsorbing parts.

4. The method of claim 1, further comprising:
   detecting, by an ultrasonic sensor, a thickness of the thin film sheet or the number of thin film sheets adsorbed to the adsorbing parts through.

5. The method of claim 1, further comprising:
   stopping the adsorbing of the adsorbing parts and unloading the thin film sheet.

6. A non-transitory computer-readable recording medium comprising computer executable instructions execution of which causes a controller to perform the method according to claim 1.

* * * * *